United States Patent Office 3,309,338
Patented Mar. 14, 1967

3,309,338
STABILIZED POLYVINYL HALIDE
COMPOSITIONS
James P. Scullin, Pompton Lakes, N.J., assignor to Tenneco Chemicals, Inc., a corporation of Delaware
No Drawing. Filed Dec. 17, 1963, Ser. No. 331,111
7 Claims. (Cl. 260—41)

This invention relates to stabilizers for polyvinyl halide resins and to the resinous compositions stabilized therewith.

Pentaerythritol and dipentaerythritol are widely used in asbestos-filled vinyl halide/vinyl acetate resinous compositions such as those used in floor coverings because they impart good initial color and good thermal stability to the compositions. When these polyhydric alcohols are used in similar compositions that are based on vinyl halide homopolymers, however, large amounts of lachrymatory gas are evolved during the milling procedure, probably as the result of partial pyrolysis of the polyhydric alcohol. The presence of this gas, which is believed to comprise methacrolein and other unsaturated aldehydes, makes the fabrication and handling of the stabilized compositions difficult and hazardous to operating personnel.

In accordance with the present invention, it has been found that the generation of lachrymatory gas during the manufacture of asbestos-filled vinyl halide homopolymer compositions that contain pentaerythritol and/or dipentaerythritol as thermal stabilizer can be inhibited or prevented by substituting dicyandiamide for a portion of the stabilizer. The resulting compositions can be milled and fabricated under the conditions ordinarily employed in the preparation of asbestos-filled vinyl halide compositions without the evolution of lacrymatory gas. In addition, the use of the novel stabilizers in vinyl halide homopolymer compositions results in products that are characterized by excellent color and color retention and long-term thermal stability.

The novel stabilizers that can be used to provide resinous compositions that have improved thermal stability and other properties and that do not evolve lachrymatory gas during their processing comprise approximately 1 part to 7 parts of pentaerythritol, dipentaerythritol, or a mixture thereof, and approximately 1 part to 10 parts of dicyandiamide. The technical grades of pentaerythritol, which contain 10%–20% of dipentaerythritol, are particularly suitable for use in the stabilizers of this invention. It is generally most convenient to incorporate in the vinyl halide homopolymer composition a stabilizer mixture comprising the required amounts of polyhydric alcohol and dicyandiamide. If desired, however, the stabilizer components may be added separately provided that the dicyandiamide is added to the composition prior to or simultaneously with the addition of the polyhydric alcohol component.

Only a small amount of the novel stabilizer need be present in the vinyl halide homopolymer compositions of the present invention. It has been found that as little as 1% of the stabilizer, based on the weight of the vinyl halide homopolymer, will bring about an appreciable improvement in the heat and light stability of the composition. Approximately 10% or more of the stabilizer can be used, but these larger amounts generally do not provide further improvement in the properties of the resinous composition and for this reason are not ordinarily used. While the amount of the stabilizer that will provide optimum heat and light stability depends upon such factors as the choice of vinyl halide homopolymer and the properties desired in the stabilized compositions, in most cases approximately 3% to 6% of the stabilizer, based on the weight of the vinyl halide homopolymer is used.

The vinyl halide homopolymers that may be employed in the compositions of this invention are the resinous products obtained by the polymerization of a vinyl halide. The term "vinyl halide homopolymer" as used herein includes polyvinyl chloride, polyvinyl bromide, polyvinyl fluoride, polyvinylidene chloride, polyvinylidene bromide, and mixtures thereof.

While the stabilizer mixtures of the present invention may be used in vinyl halide homopolymer compositions containing a wide variety of inorganic fillers, they are of particular value in asbestos-filled polyvinyl halide compositions, such as those used in the preparation of floor coverings. Included among the inorganic fillers that can be used in the compositions of the present invention are both fibrous and non-fibrous fillers. While either type of filler may be used as the sole inorganic filler, the compositions generally contain both fibrous and non-fibrous fillers.

The fibrous fillers that can be used in the novel compositions include asbestos and the mineral wools. Asbestos is the most commonly used and the preferred fibrous inorganic filler. It is usually present in the amount of approximately 50 parts to 200 parts and preferably 80 parts to 150 parts per 100 parts of the vinyl halide homopolymer. Any of the commercially available grades of asbestos which are commonly used in the preparation of floor covering compositions can be used in the practice of this invention.

The useful non-fibrous inorganic fillers include the many materials that are commonly employed as fillers by the plastics industry. These include, for example, calcium carbonate, calcium sulfate, calcium silicate, barium carbonate, barium sulfate, silica, china clay, kaolin, fuller's earth, and magnesium silicate as well as such pigments as titanium dioxide, lead chromate, and iron oxide. The non-fibrous fillers are generally used in amounts ranging from 50 parts to 300 parts and preferably from 100 parts to 200 parts per 100 parts of the resin. While a single non-fibrous filler may be used, a mixture of two or more of these fillers which includes at least one pigment is generally preferred.

Any of the usual plasticizers for vinyl halide homopolymers may be present in the compositions of this invention. These include, for example, di-2-ethylhexyl phthalate, dibutyl sebacate, dioctyl sebacate, tricresyl phosphate, and the like. The amount of plasticizer that is used is generally within the range of approximately 5 parts to 100 parts per 100 parts of the resin, with 15 parts to 50 parts preferred.

In addition to the aforementioned ingredients, the vinyl halide homopolymer compositions may also contain one or more of the previously known heat and light stabilizers for vinyl halide resins. These include, for example, metal soaps, such as the barium, cadmium, and zinc salts of fatty acids, benzoic acid, or p-tert. butylbenzoic acid; metal phenates, such as the barium, cadmium, and zinc salts of phenol or an alkylphenol; organic phosphites, such as triphenyl phosphite, diphenyl octyl phosphite, and isooctyl di-tert. octylphenyl phosphite; and epoxidized oils, such as epoxidized soybean oil and esters of epoxidized tall oil fatty acids. Extenders, solvents, dyes and the like may also be present in the amounts ordinarily employed for the purposes indicated.

The stabilized vinyl halide homopolymer compositions may be prepared by any suitable and convenient procedure. For example, the vinyl halide homopolymer, inorganic filler, stabilizer, and other ingredients may be blended with or without the aid of a volatile solvent and the resulting composition milled on rolls at 200° F. to 350° F. until it is homogeneous. The stabilized resinous composition may then be removed from the mill in the form of a film or sheet of the desired thickness. It may be used as such or subjected to a polishing or embossing treatment.

This invention is further illustrated by the examples that follow. It is to be understood, however, that these examples are given solely for the purpose of illustration and that the invention is not to be regarded as being limited to any of the specific materials or conditions recited therein except as set forth in the appended claims. In this specification, parts and percentages are by weight unless otherwise indicated.

Example 1

To a mixture of 100 parts of polyvinyl chloride (Goodrich Resin 100 Cl 4), 115 parts of chrysotile asbestos, 285 parts of ground limestone, 32 parts of di-2-ethylhexyl phthalate, 4 parts of epoxidized soybean oil, and 35 parts of titanium dioxide (rutile) was added 5 parts of a stabilizer. The mixture was blended at room temperature and then charged to a two-roll, steam-heated, differential speed mill whose roll surface temperature was maintained at 300° F. The mixture was milled for 20 minutes and then removed from the rolls as a flexible homogeneous sheet 0.045 inch in thickness. To determine their thermal stability, 1 x 1 inch specimens of the compositions were placed in a forced-circulation air oven at 300° C. and specimens were removed periodically until appreciable darkening had taken place. The thermal stability ratings of a series of the stabilized compositions of the present invention are given in Table I. In this table and in Table II, a numerical scale is used to indicate the color of specimens, with a rating of 1 indicating the very pale gray color which is the inherent color imparted by the asbestos and other fillers to the vinyl chloride homopolymer, 2 light gray, 3 dark gray, 4 dark bluegray, and 5 dark blue, the darkening being the manifestation of thermal degradation.

Example 2

To a mixture of 115 parts of polyvinyl chloride (Goodrich Resin 100 Cl 4), 150 parts of chrysotile asbestos, 414 parts of ground limestone, 52 parts of di-2-ethylhexyl phthalate, 6 parts of epoxidized soybean oil, and 8 parts of titanium dioxide (rutile) was added 6 parts of a stabilizer. The mixture was blended at room temperature and then charged to a two-roll, steam-heated, differential speed mill whose roll surface temperature was maintained at 300° F. The mixture was milled for 20 minutes and then removed from the rolls as a flexible homogeneous sheet 0.045 inch in thickness. The thermal stability ratings of the resulting compositions, which were determined by the procedure described in Example 1, are given in Table II.

TABLE II

| Ex. No. | Stabilizer | Lachrymatory Gas Evolved During Milling | Initial Color | Color After Indicated Number of Minutes at 300° F. | | | | | | | | | | | |
|---|---|---|---|---|---|---|---|---|---|---|---|---|---|---|---|
| | | | | 15 | 30 | 45 | 60 | 75 | 90 | 105 | 120 | 135 | 150 | 165 | 180 |
| 2A | 1 part pentaerythritol, 1 part dicyandiamide. | None after 20 minutes | 2 | 2 | 2 | 2 | 2 | 2 | 2 | 2 | 2 | 2 | 2 | 2 | 3 |
| 2B | 1 part pentaerythritol, 1 part urea. | None after 20 minutes; odor of ammonia detected. | 1 | 1 | 1 | 1 | 2 | 2 | 3 | 3 | 3 | 4 | 4 | 4 | 5 |
| 2C | 1 part pentaerythritol, 1 part benzoguanamine. | Strong after 5 minutes | 2 | 2 | 2 | 2 | 2 | 2 | 3 | 3 | 3 | 3 | 3 | 3 | 3 |
| 2D | Pentaerythritol | do | 2 | 2 | 2 | 2 | 2 | 2 | 3 | 3 | 4 | 4 | 4 | 4 | 5 |

What is claimed is:

1. The method for the prevention of the evolution of lachrymatory gases during the heating at a temperature in the range of approximately 200° F. to 350° F. of a resinous composition comprising a vinyl halide homopolymer, asbestos, and a polyhydric alcohol selected from the group consisting of pentaerythritol, dipentaerythritol, and mixtures thereof which comprises adding a stabilizing amount of dicyandiamide to said resinous composition prior to said heating step.

2. The method of claim 1 wherein the amount of dicyandiamide added to the resinous composition is approximately 1 to 10 parts by weight per 1 to 7 parts by weight of said polyhydric alcohol.

3. The method of claim 1 wherein the amount of dicyandiamide added to said resinous composition is 0.15 part to 1 part by weight per part by weight of said polyhydric alcohol.

4. The method of claim 1 wherein the dicyandiamide is added to the resinous composition simultaneously with the addition of said polyhydric alcohol.

5. The method of claim 1 wherein the dicyandiamide is added to the resinous composition prior to the addition of said polyhydric alcohol.

6. The method for the prevention of the pyrolysis of a polyhydric alcohol selected from the group consisting of pentaerythritol, dipentaerythritol, and mixtures thereof during its heating at a temperature in the range of approximately 200° F. to 350° F. in the presence of a vinyl halide homopolymer and asbestos which comprises carrying out the heating of said polyhydric alcohol in the presence of a stabilizing amount of dicyandiamide.

TABLE I

| Ex. No. | Stabilizer | Lachrymatory Gas Evolved During Milling | Initial Color | Color After Indicated Number of Minutes at 300° F. | | | | | | | | | |
|---|---|---|---|---|---|---|---|---|---|---|---|---|---|
| | | | | 15 | 30 | 45 | 60 | 75 | 90 | 105 | 120 | 135 | 150 |
| 1A | 1 part pentaerythritol, 1 part dicyandiamide. | None after 20 minutes | 1 | 1 | 1 | 1 | 1 | 1 | 2 | 2 | 2 | 2 | 2 |
| 1B | 4 parts pentaerythritol, 1 part dicyandiamide. | do | 1 | 1 | 1 | 1 | 1 | 2 | 2 | 2 | 3 | 3 | |
| 1C | 7 parts pentaerythritol, 1 part dicyandiamide. | do | 1 | 1 | 1 | 1 | 1 | 2 | 2 | 2 | 3 | 3 | 4 |
| 1D | 9 parts pentaerythritol, 1 part dicyandiamide. | Very faint after 10 minutes | 1 | 1 | 1 | 1 | 2 | 2 | 2 | 2 | 3 | 3 | 4 |
| 1E | 1 part dipentaerythritol, 1 part dicyandiamide. | None after 20 minutes | 2 | 2 | 2 | 2 | 2 | 2 | 2 | 2 | 2 | 2 | 2 |
| 1F | Pentaerythritol | Strong after 4 minutes | 1 | 1 | 1 | 1 | 1 | 2 | 2 | 3 | 3 | 4 | 5 |
| 1G | Dipentaerythritol | Faint after 5 minutes | 2 | 2 | 2 | 2 | 2 | 2 | 2 | 2 | 2 | 3 | 3 |
| 1H | Dicyandiamide | None after 20 minutes | 2 | 2 | 2 | 2 | 2 | 2 | 2 | 2 | 2 | 2 | 2 |

7. The method of claim 6 wherein 0.15 part to 1 part by weight of dicyandiamide is present per part by weight of said polyhydric alcohol.

References Cited by the Examiner

UNITED STATES PATENTS

| | | | |
|---|---|---|---|
| 2,367,483 | 1/1945 | Cheyney | 260—45.9 |
| 2,899,398 | 8/1959 | Pflaumer | 260—45.9 |
| 3,084,135 | 4/1963 | Scullin | 260—41 |
| 3,194,786 | 7/1965 | Scullin | 260—41 |

MORRIS LIEBMAN, *Primary Examiner.*

ALLAN LIEBERMAN, *Examiner.*

J. S. WALDRON, *Assistant Examiner.*